J. M. BOYLE & F. W. ROLLER.
REGULATOR FOR TANGENTIAL WATER WHEELS.
APPLICATION FILED APR. 1, 1908.
907,725.
Patented Dec. 29, 1908.
7 SHEETS—SHEET 2.
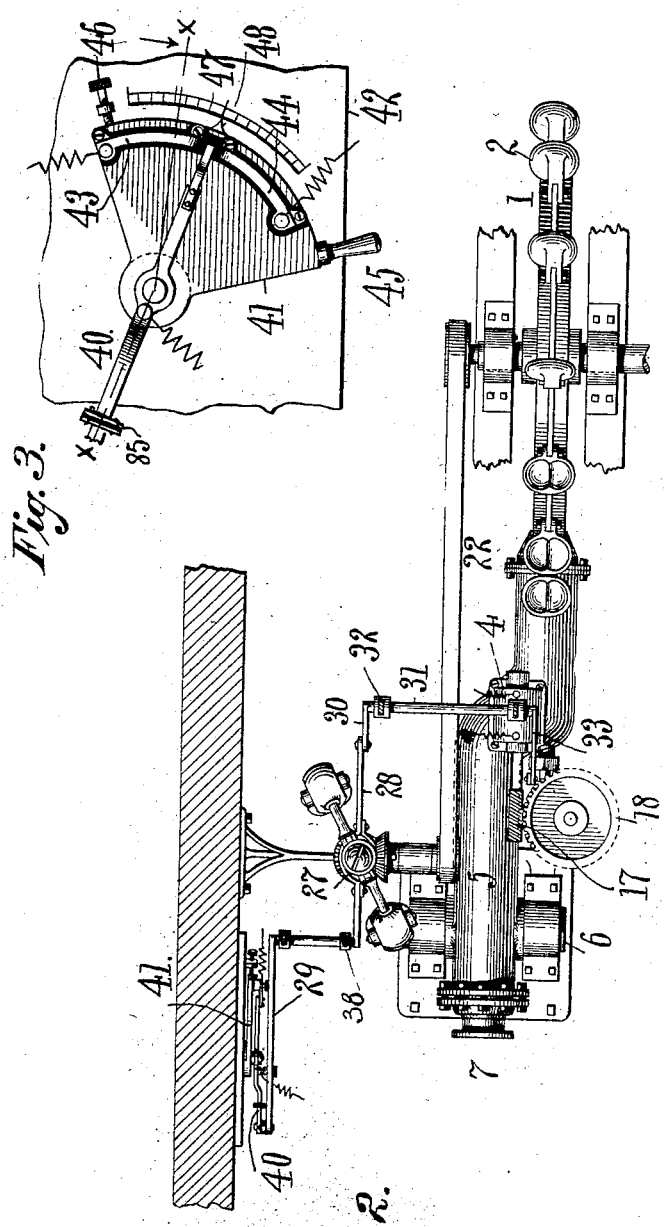
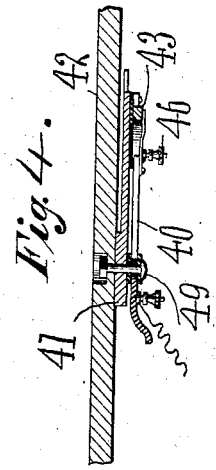

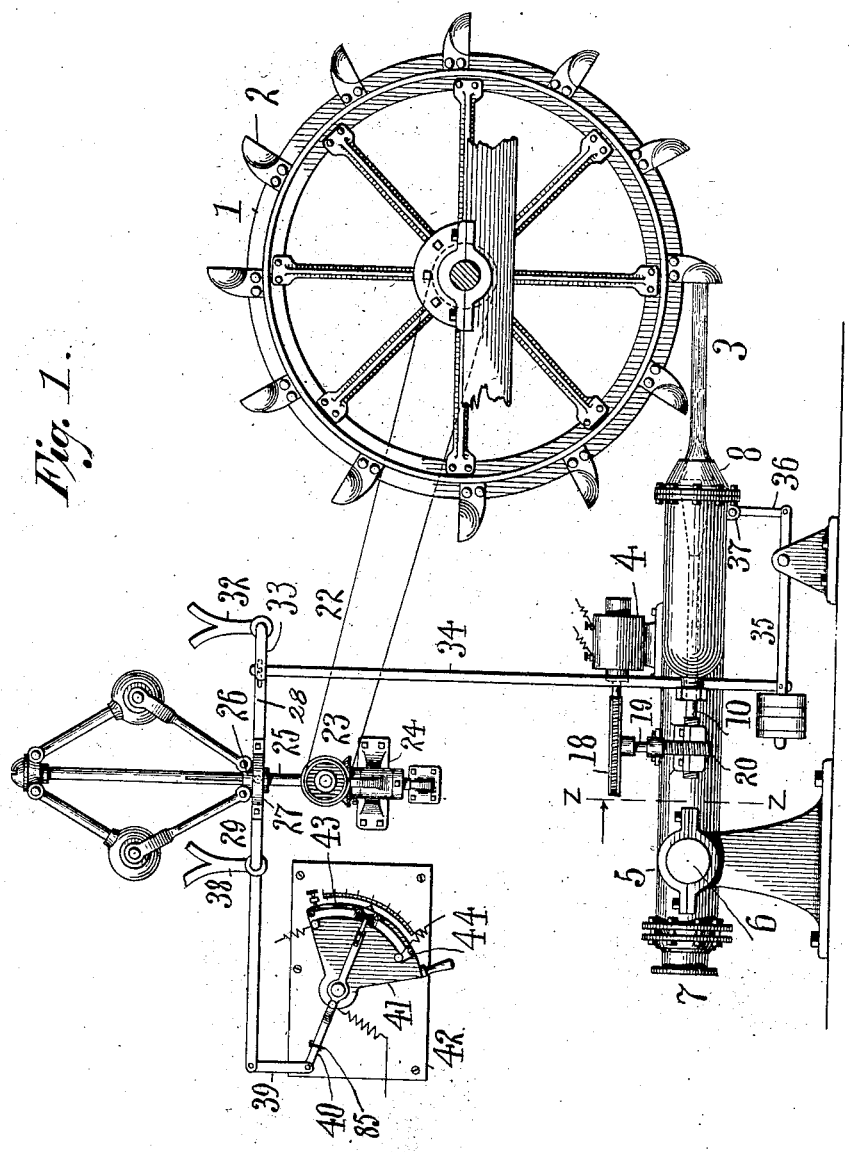

J. M. BOYLE & F. W. ROLLER.
REGULATOR FOR TANGENTIAL WATER WHEELS.
APPLICATION FILED APR. 1, 1908.

907,725.

Patented Dec. 29, 1908.

7 SHEETS—SHEET 3.

Witnesses:
C. H. Bertholf
B. Shoelau

James M. Boyle
Frank W. Roller
Inventors

By their Attorney

J. M. BOYLE & F. W. ROLLER.
REGULATOR FOR TANGENTIAL WATER WHEELS.
APPLICATION FILED APR. 1, 1908.

907,725.

Patented Dec. 29, 1908.

7 SHEETS—SHEET 4.

Witnesses:
C. H. Bertholf
B. Skoelson

James M. Boyle
Frank W. Roller
Inventors

By their Attorney

J. M. BOYLE & F. W. ROLLER.
REGULATOR FOR TANGENTIAL WATER WHEELS.
APPLICATION FILED APR. 1, 1908.

907,725.

Patented Dec. 29, 1908.

7 SHEETS—SHEET 5.

UNITED STATES PATENT OFFICE.

JAMES M. BOYLE AND FRANK W. ROLLER, OF NEW YORK, N. Y.

REGULATOR FOR TANGENTIAL WATER-WHEELS.

No. 907,725.     Specification of Letters Patent.     Patented Dec. 29, 1908.

Application filed April 1, 1908. Serial No. 424,472.

*To all whom it may concern:*

Be it known that we, JAMES M. BOYLE and FRANK W. ROLLER, citizens of the United States, residing at New York, in the county of New York and State of New York, have invented a certain new and useful Improvement in Regulators for Tangential Water-Wheels, of which the following is a specification.

The invention is a regulator for tangential water wheels.

The principle of the invention is as follows: 1. When the speed of the wheel is varied, as by the addition or removal of load, to cause, primarily, a deflection of the jet to alter the point of impact thereof upon the wheel bucket, and then, by reason of the ensuing change in speed of the wheel, to vary the cross-sectional area of the jet and bring back or redeflect said changed jet to a selected point of impact on said bucket: all by automatic mechanism controlled by the wheel itself. 2. To select and determine, by means of an independent device manually operated or set as desired, and combined with the automatic mechanism aforesaid, the position of the said point of impact. The term "point of impact" as herein used, means the point at which the longitudinal axial line of the impelling jet intersects the bucket surface.

Figure 6:
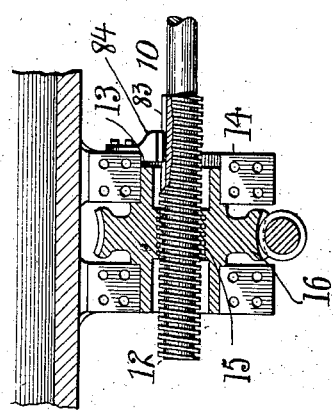
Figure 7:
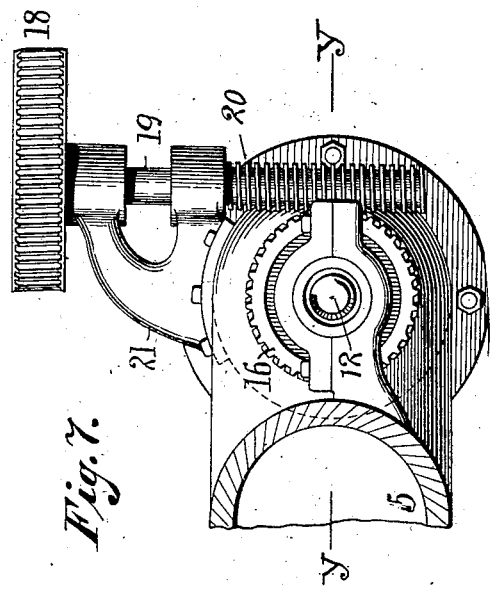
Figure 5:
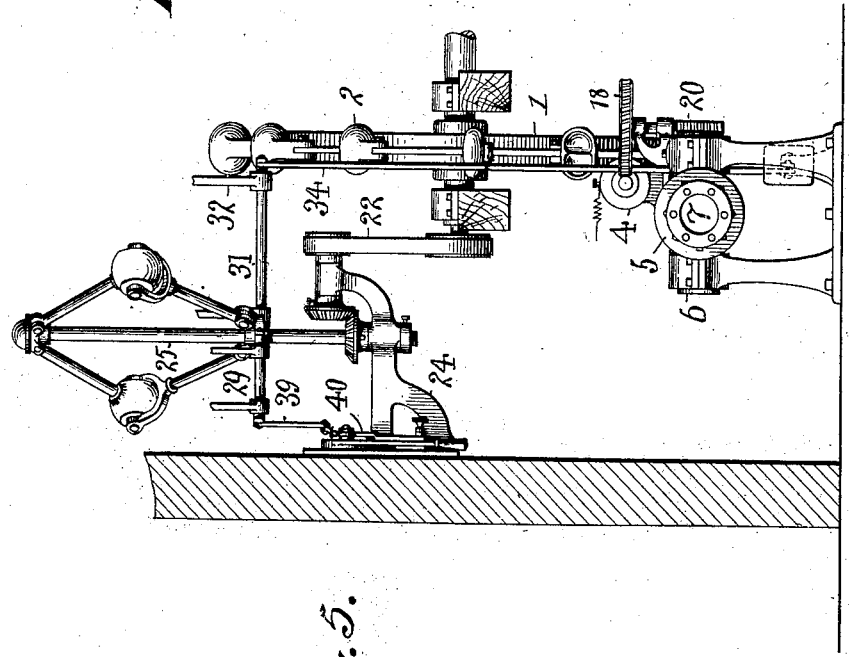
Figure 8:
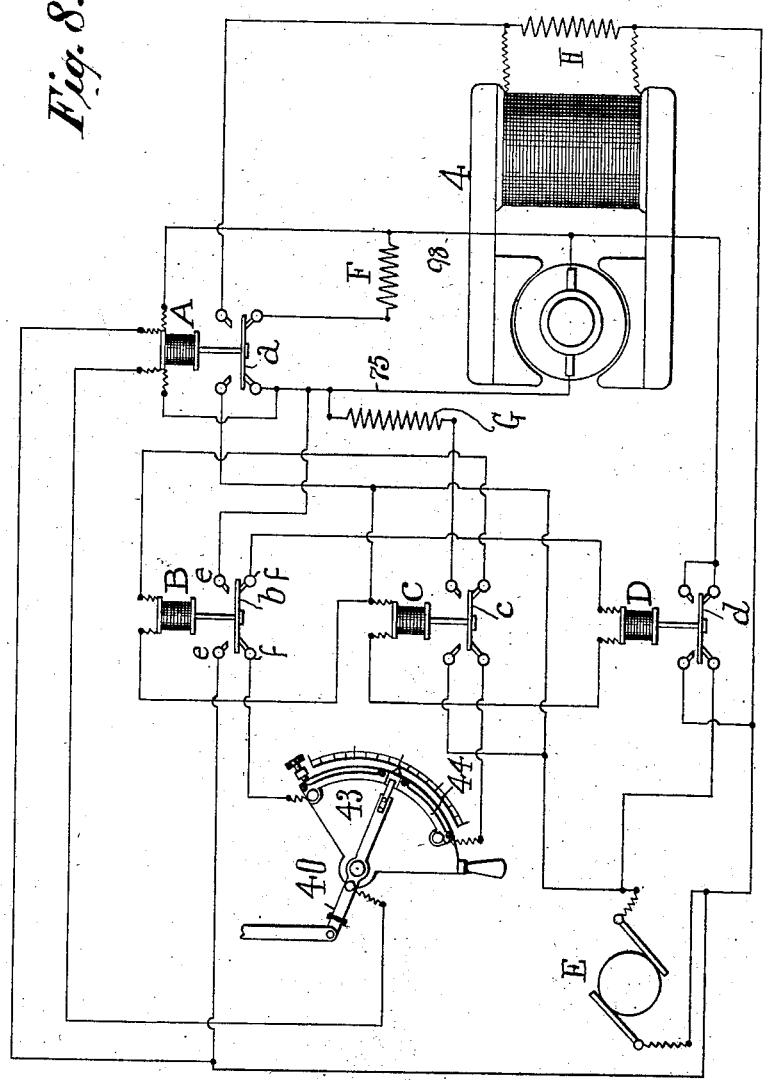
Figure 9:
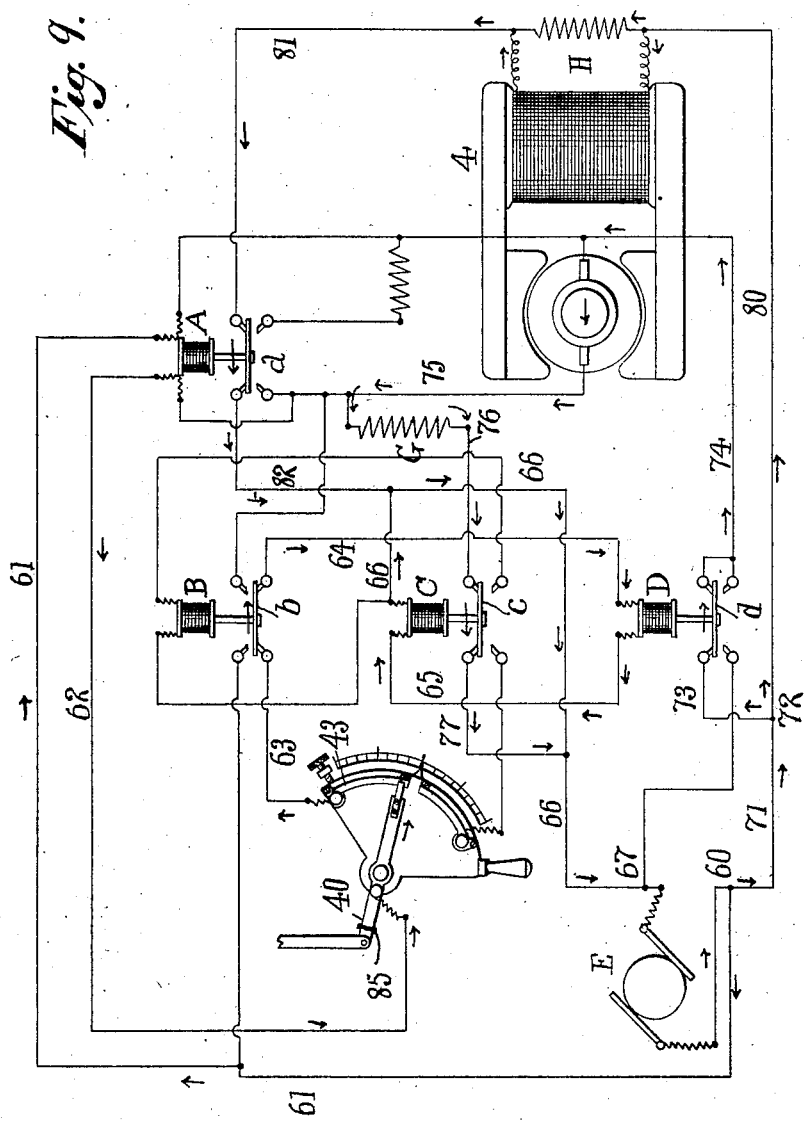
Figure 10:
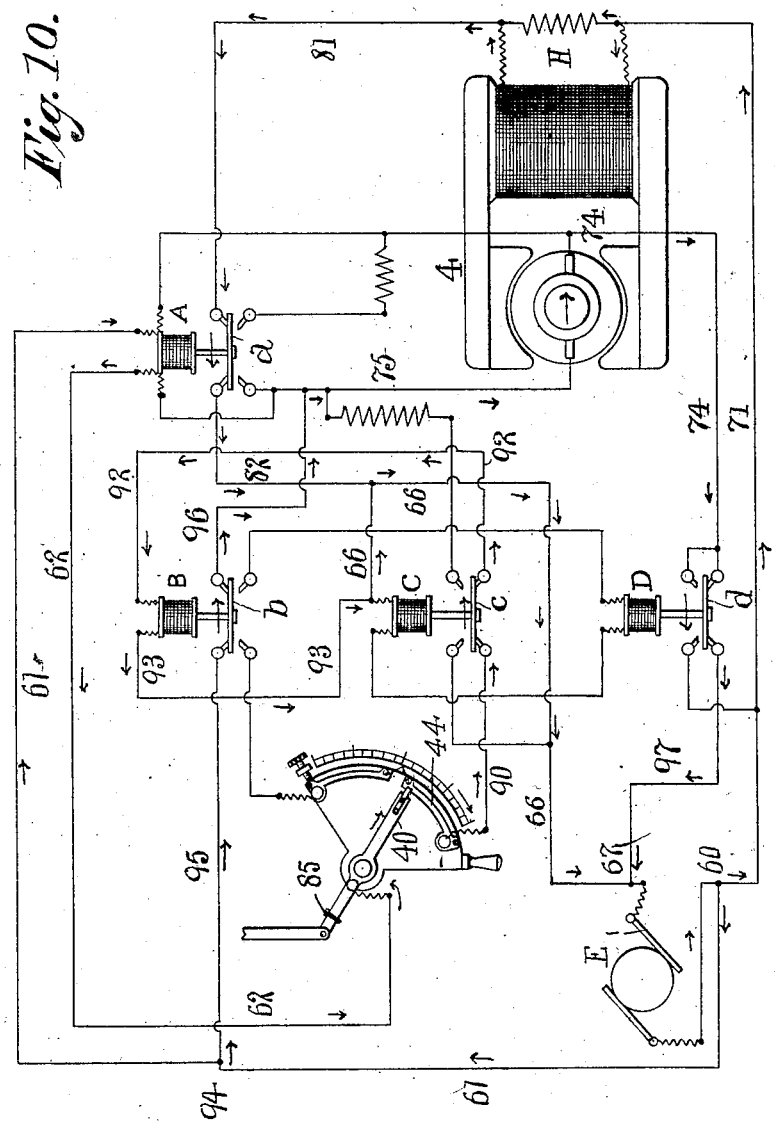
Figure 11:
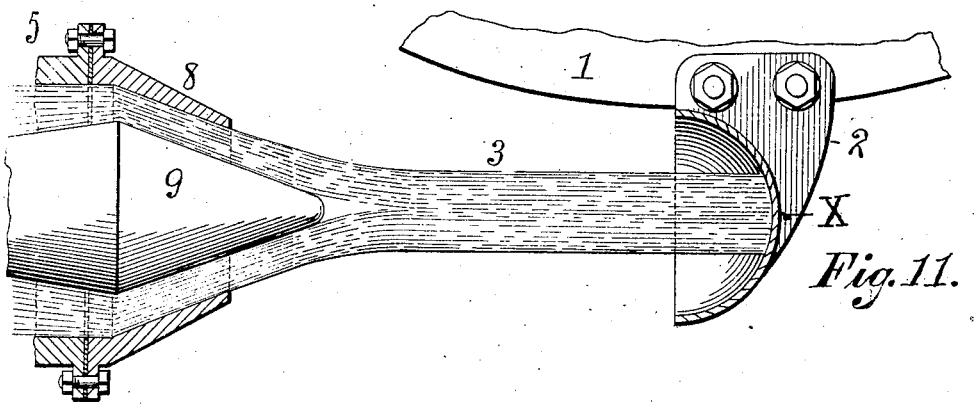
Figure 12:
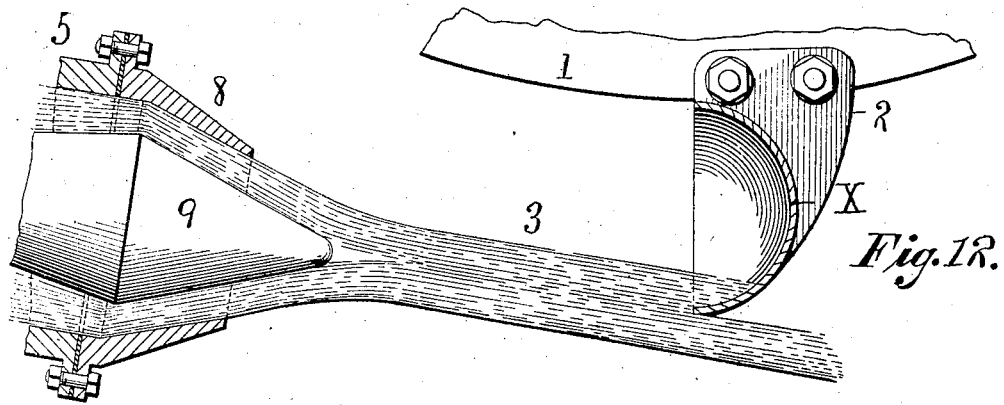
Figure 13:
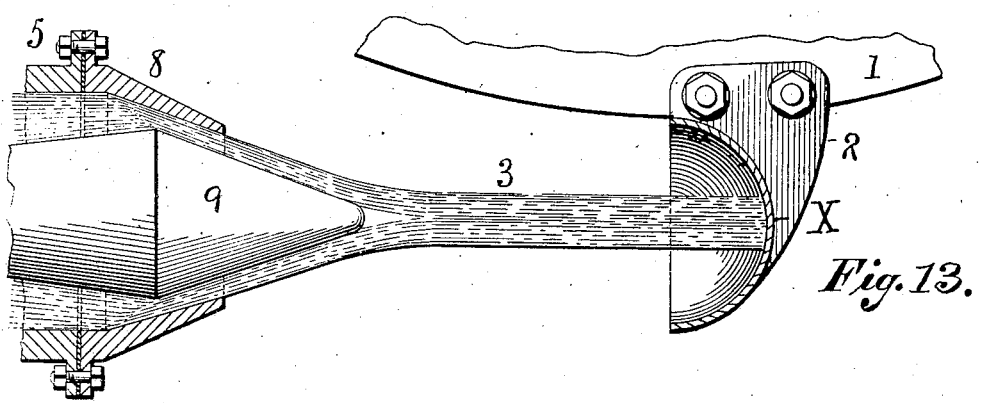

In the accompanying drawings—Figure 1 is an elevation of a tangential water wheel with our regulating apparatus applied thereto, the electrical connections being omitted for clearness. Fig. 2 is a top view of the same. Fig. 3 is an enlarged plan view of the electrical connecting device. Fig. 4 is a section on the line *x x* of Fig. 3. Fig. 5 is an end elevation of the whole apparatus, as shown in Fig. 1. Fig. 6 is a detailed sectional view, showing the threaded valve spindle, sleeve and nut thereon, the supporting bearings and the pinion on said nut, these parts being in section on the line *y y* of Fig. 7. Fig. 7 is a partial section on the line *z z*, Fig. 1 and an end elevation of a part of the nozzle tube, showing the end of the valve spindle and the gearing connected therewith. Figs. 8, 9 and 10 are electrical diagrams. Fig. 8 shows the circuit conditions when the motor is not operating. Fig. 9, the circuit conditions when it is rotating in one direction and, Fig. 10, the circuit conditions when it is rotating in the reverse direction. Figs. 11, 12 and 13 show a portion of the wheel periphery, a bucket thereon in section, the nozzle tip also in section, the needle valve and the water jet. These figures illustrate the action of the apparatus upon the jet in performing its regulating functions.

Similar numbers and letters of reference indicate like parts.

*The nozzle deflecting mechanism.*—1 is a tangential water wheel having attached to its periphery the buckets 2. The actuating water jet 3 is delivered to the buckets from a needle regulating nozzle, the supply tube 5 of which is supported on trunnions 6, and receives water from any suitable flexible or jointed conduit (not shown) connected at the end 7. Said tube is bent laterally at its front portion and has a converging nozzle tip 8 in which is disposed the needle valve 9 carried by the spindle 10. Said spindle extends through the rear wall of the bent portion of the tube 5, and is threaded over a portion of its length as shown at 12, Fig. 6. On the part 12 is a sleeve 13, journaled in bearings 14, supported on the side of tube 5. The middle part of said sleeve forms a nut 15 on the said threaded part 12, and carries the spiral gear 16 which comes between the bearings 14. By turning the gear 16, it is obvious, that the spindle 10 may be moved longitudinally and the needle valve 9 thus moved to or from its seat, in the tip 8, to diminish or increase the size of the water jet. Rotation of the spindle 10 is prevented by the spline 83 thereon entering the fixed guide 84, Fig. 6.

The spindle 10 is operated by an electric motor 4, which is mounted on the tube 5. The rotary shaft of said motor carries a worm 17, which engages with the worm wheel 18 on the vertical shaft 19, Fig. 7. Said shaft is supported in bearings in a bracket 21 fixed on the upper side of tube 5. The shaft 19 carries a worm 20, which engages with gear 16, and so communicates motion to the screw threaded portion 12 of valve spindle 10.

In order to alter the direction of the water jet 3, the nozzle tube 5 is swung on its trunnions 6. This is done by the following means. On the shaft of the wheel 1 is a pulley which drives the belt 22, and said belt through a pulley and bevel gearing at 23 rotates the governor shaft 25, which is disposed in bearings in bracket 24. The governor shaft carries the usual jointed arms and balls which raise or lower the collar 26, sliding on shaft 25, in the ordinary way, as the speed of the water wheel increases or diminishes. A ring 27 is pivoted to an intermediate collar in which collar 26 turns and has two arms 28 and 29. The ring arm 28 connects to an arm 30 on the end of a double bell crank lever 31 supported in any suitable brackets 32, Fig. 2. The arm 33 at the other end of said lever connects by link 34 to one arm of the counterweighted pivoted lever 35. The opposite arm of lever 35 connects by link 36 to a lug 37 on the under side of the tube 5. By reason of the foregoing construction, when the speed of the wheel 3 increases, the governor balls move outwardly raising the collar 26, which, through the described linkage, causes the nozzle tube to swing downwardly and so to deflect the water jet in a direction radial to and away from the wheel center. On the other hand, when the speed of the wheel decreases, the governor balls move inwardly, and through the means described the nozzle tube is swung upwardly and the water jet deflected in a direction radial to and toward the wheel center. Or, in other words, the water jet may by this swinging of the nozzle tube be directed against any point of the bucket lying in the plane of its movement, or be deflected partially or wholly from said bucket.

*The electrical controlling device,* (Fig. 3.)—The ring arm 29 is bent twice and supported in fixed brackets 38. Its extremity is connected by a link 39 to one end of the contact lever 40, which is carried on a pivot 49, but insulated therefrom. (Fig. 4.) Said lever moves over a metal segment 41, also carried by the pivot 49, upon any suitable fixed support or back plate 42. Any suitable form of insulating coupling (indicated at 85) is inserted in the lever arm 40 to prevent grounding of current. On said segment 41, but insulated therefrom, are two curved contact strips 43, 44. (See Fig. 3). Normally the contact end of lever 40 lies between said strips touching neither, but when said lever is turned on its pivot by the action of the governor through arm 29, then the lever 40 makes contact with either strip 43 or strip 44, in accordance with the direction in which it is moved. The segment 41 is provided with a handle 45 by which it can be moved on its pivot independently of lever 40. A clamping screw 46 is provided for holding the segment in adjusted position. On the back plate 42 is a graduated scale 47, and on the segment 41 is an index 48.

*The electrical control system.*—The circuit connections are illustrated in Figs. 8, 9, 10. The system includes four electro magnets A, B, C, D, which may be of the sucking solenoid type, actuating respectively circuit closing plates a, b, c, d. Plate b, in accordance as it is up or down, closes contact between fixed contact terminals e or fixed contact terminals f. Plates a, c and d close contact between pairs of fixed contact terminals similarly arranged. E is a dynamo or other source of current and F, G, H, are resistances in circuit, these parts being indicated symbolically. The lever 40 and the outer ends of the insulated contact strips 43, 44, are connected in circuit.

The normal condition of the system, when the contact lever 40 is not touching either contact strip 43 or 44 is shown in Fig. 8. The electro magnets A, B, C, D, are then not energized and the circuit closing plates a, b, c, d, are down, closing circuit between the lower pairs of fixed terminals.

The operation is as follows:

I. The speed of the water wheel increases. The governor balls lift collar 26 which through the intermediate linkage already described moves the lever 40 into contact with strip 43. The resulting conditions are shown in Fig. 9. Beginning at dynamo E, circuit proceeds to point 60, and there divides into two branches.

*1. The control circuit.*—One branch circuit proceeds by wire 61 to magnet A; by wire 62 to lever 40, to strip 43; by wire 63 to contact plate b; by wire 64 to magnet D; by wire 65 to magnet C; by wire 66, to point 67, which connects to dynamo. Magnets A, C and D being thus energized raise their contact plates a, c, d, to close circuit through the upper pairs of fixed terminals.

*2. The motor armature circuit.*—The other branch circuit proceeds by wire 71 to point 72 and divides. The first sub-branch circuit proceeds by wire 73 to circuit closing plate d; by wire 74 to the right hand terminal of the motor armature; by wire 75 to and through resistance G; by wire 76 to circuit closing plate c; by wire 77 to wire 66, point 67 and dynamo.

*3. The motor field-circuit.*—The second sub-branch circuit proceeds from point 72 by wire 80 to the field of the motor and shunt resistance H; by wire 81 to circuit closing plate a; by wire 82 to wire 66, point 67 and dynamo. The motor rotates say from right to left, or in such direction as to cause the needle valve to reduce the area of the water jet. This, by reason of the resistance G, slowly.

II. The speed of the water wheel diminishes. The governor balls moving inwardly lower the collar 26 and the intermediate linkage already described moves the lever 40 into contact with strip 44. The resulting conditions are shown in Fig. 10.

*1. The control circuit.*—Beginning at dynamo E circuit proceeds to point 60; by wire 61 to magnet A; by wire 62 to lever 40 to strip 44; by wire 90, contact plate c and by wire 92 to magnet B; by wire 93 to wire 66, point 67 and dynamo.

*2. The motor armature circuit.*—A branch circuit proceeds from the point 94 (on wire 61) by wire 95 to circuit closing plate b; by wire 96 to wire 75 to the left hand armature terminal through the armature to wire 74, to circuit closing plate d, to wire 97, to point 67 and dynamo.

3. *The motor field circuit.*—The second sub-branch circuit proceeds from dynamo to point 60 to wire 71 to the field of the motor and shunt resistance H; by wire 81 to circuit closing plate a; by wires 82 and 66 to point 67 and dynamo. The motor then rotates in the reverse direction, so as to cause the needle valve to increase the area of the water jet, and as there is no resistance similar to G inserted in the armature circuit, this motion is effected rapidly.

*The operation and timing of the whole apparatus.*—This is as follows: referring to Figs. 11, 12 and 13. Assume the needle valve to be open as indicated in Fig. 11, and the jet 3 to be directed so that its longitudinal axial line intersects the point X. Assume the speed of the wheel to increase. Then, through the operation of the governor, as already described, the jet would be deflected downwardly as in Fig. 12; say to such an extent as that the lower edge of the bucket bisects the jet. Then all of the jet below the bucket edge would pass the bucket without exercising any impelling effect thereon and go to waste. The speed of the wheel now diminishes. The governor then brings the jet back to its original position and through the electrical control and motor moves the needle valve to reduce the jet area. The axial line of the reduced line now meets the point X. Hence, instead of impelling the wheel by a fraction of the jet, leaving the remainder to go to waste as in Fig. 12, a fraction of the jet strikes the wheel at the point X and no fraction goes to waste. In other words, when the wheel increases speed, the apparatus reduces the area of the water jet while maintaining the axial line of the reduced jet intersecting a selected point on the bucket. This operation is purely automatic and dependent upon the speed of the wheel. It saves waste of water; it adjusts the supply of water to the speed of the wheel, and as the final result, regulates the wheel speed to some predetermined rate whenever that rate is departed from, for example, by reason of change of load. Now assuming the condition represented in Fig. 13, having been attained, the wheel under increased load should fall off in speed. Then the converse operation would ensue. The jet would be raised, the needle valve would be opened to admit a jet of increased area and the enlarged jet would be brought back to the position shown in Fig. 11. So that throughout the running of the wheel, variations in the speed of the wheel, due for example to changes in load, instantly affect the regulating apparatus causing it to increase or diminish the area of the jet and to keep the jet when adjusted, upon a selected point on the bucket.

It will be noted that the resistance G comes into operation when the jet is diminished. Its purpose is to retard this diminution and so prevent the percussive or water hammer effect of the water in the pipes, which might otherwise follow. The resistance F is simply a brake resistance for checking motor speed, so as to enable the motor to stop promptly when the apparatus is not performing its regulating function. As shown in Fig. 8, the motor armature circuit is then closed through the plate a, and wires 75 and 98. The resistance H is the usual resistance placed across the terminals of the motor field to take care of the inductive discharge therefrom, when the field circuit is suddenly opened.

*The manual adjustment of the point of impact of the jet.*—Returning now to the electrical controlling device, Fig. 3: It has already been stated that the segment 41 may be turned on its pivot by hand, the operator grasping the handle 45. In this way he moves either strip 43 or 44 into contact with the lever 40. Or, in other words, he does manually what the governor may accomplish automatically in the sense of establishing contact between the lever 40 with either strip 43 or 44. If, therefore, the operator establishes contact between lever 40 and strip 43, the electrical conditions illustrated in Fig. 9 are created. The motor then operates to reduce the jet. As a consequence the speed of the wheel falls off. The conditions of Fig. 10 then follow. The motor then reverses, increasing the water jet and increasing the wheel speed until by the action of the governor the lever 40 is moved off of the strip 43 and into the space between the strips 43 and 44. But the displacement of the segment 41 has changed the position of this space, so that when the lever comes to rest in this space the point at which the axial line of the jet meets the wheel bucket is not the same point which it met before the segment was moved, but is located further from the wheel periphery. So that the net result in this case of moving the segment 41 by hand to bring the strip 43 into contact with lever 40 is simply to lower the point of impact of the water jet on the bucket. The converse operation takes place when the segment 41 is moved by hand to bring the strip 44 into contact with the lever 40, with the net result of raising the point of impact of the water jet on the bucket. The extent of displacement of the point of impact of the jet will obviously also depend upon the extent of displacement of the segment 41, since the time of the operation will be lengthened proportionately to the distance traveled by the lever 40 in returning to the space between strips 43 and 44. It will be seen, therefore, that the electrical controlling device while operated automatically by the governor, may be previously set by hand to cause the jet to be directed on any desired point of impact on the bucket, and there maintained. This may or may not be the point of maximum impelling effect, as the operator may desire. But, in any event, the deflections of the jet under the control of the apparatus will be with reference to the point selected. The scale 47 and index 48 assist in adjusting the segment 41 to any desired position and to enable it to be accurately reset. The clamping screw 46 then secures it as adjusted.

We claim:

1. In combination with a tangential water wheel and a device for delivering a jet to the bucket thereof, means governed by variations in speed of said wheel for deflecting said jet and electrically actuated mechanism governed by said speed variation for changing the cross-sectional area of said jet.

2. In combination with a tangential water wheel and a device for delivering a jet to the buckets thereof, a governor operated by variations in speed of said wheel, and, controlled by said governor, an electrically actuated mechanism for varying the cross-sectional area of said jet and means for deflecting said jet.

3. In combination with a tangential water wheel a movable nozzle for delivering a jet to the buckets thereof, a valve controlling said jet, a governor operated by variations in speed of said wheel, transmitting mechanism between said governor and said nozzle for moving said nozzle to deflect said jet, an electric motor, and means controlled by said governor for controlling said motor to operate said nozzle valve.

4. In combination with a tangential water wheel a swinging nozzle for delivering a jet to the buckets thereof, a valve controlling said jet, a governor operated by variations in speed of said wheel, transmitting mechanism between said governor and said nozzle for swinging said nozzle to deflect said jet, an electric motor, and means controlled by said governor for controlling said motor to operate said nozzle valve.

5. In combination with a tangential water wheel and a device for delivering a jet to the buckets thereof, an electrically actuated mechanism controlled by variations in speed of said wheel for changing the cross-sectional area of said jet and a manually operable device for independently controlling said electrically actuated mechanism.

6. In combination with a tangential water wheel and a device for delivering a jet to the buckets thereof, a governor controlling said device and an electrically actuated mechanism controlled by variations in speed of said wheel for changing the cross-sectional area of said jet, said mechanism comprising a manually operable device for selecting the point of impact on the wheel buckets.

7. In combination with a tangential water wheel, a jet delivering nozzle therefor, a valve controlling said jet, an electric motor controlled by variations in speed of said wheel for actuating said valve to vary the cross-sectional area of said jet; and means for controlling said motor to close said valve slowly and to open the same rapidly.

8. In combination with a tangential water wheel, a jet delivering nozzle, a valve controlling said jet, a governor controlled by speed variations of said wheel circuit terminals, a circuit closing arm controlled by said governor, to move into contact with one or the other of said terminals, an electric motor controlling said nozzle valve and circuit connections between said motor and said terminals; whereby when said arm is moved by said governor to close circuit with one of said circuit terminals said motor is actuated to move said nozzle valve in one direction, and when said arm is moved to close contact with the other of said circuit terminals said motor is actuated to move said nozzle valve in the opposite direction.

9. In combination with a tangential water wheel, a jet delivering nozzle, a valve controlling said jet, a governor controlled by speed variations of said wheel, circuit terminals, a movable support for said terminals, a circuit closing arm normally disposed between said terminals, an electric motor controlling said nozzle valve and circuit connections between said terminals and said motor; whereby when said support is moved to cause one of said terminals to close circuit with said arm said motor is actuated to move said nozzle valve in one direction, and when said support is moved to bring the other of said terminals to close circuit with said arm said motor is actuated to move said nozzle valve in the opposite direction.

10. In combination with a tangential water wheel, a movable jet delivering nozzle, a valve controlling said jet, a governor controlled by speed variations of said wheel, mechanism between said governor and said nozzle for transmitting motion from said governor to said nozzle to vary the point of impact of said jet upon the wheel buckets, circuit terminals, a circuit closing arm controlled by said governor to move into contact with one or the other of said terminals, an electric motor controlling said nozzle valve and circuit connections between said motor and said terminals; whereby said nozzle is moved by said governor to cause the said jet to strike a selected point of impact on the wheel buckets, and whereby said arm is moved by said governor to close circuit with one of said terminals and thereby to cause said motor to be actuated to vary the extent of opening of said nozzle valve.

11. In combination with a tangential water wheel, a movable jet delivering nozzle, a valve controlling said jet, a governor controlled by speed variations of said wheel, mechanism between said governor and said nozzle for transmitting motion from said governor to said nozzle to vary the point of impact of said jet upon the wheel buckets, circuit terminals, a movable support therefor, a circuit closing arm controlled by said governor to move into contact with one or the other of said terminals, an electric motor controlling said nozzle valve and circuit connections between said motor and said terminals; whereby when said support is moved to bring either of said terminals into contact with said arm, said nozzle is actuated to vary the point of impact of said jet.

In testimony whereof we have affixed our signatures in presence of two witnesses.

JAMES M. BOYLE.
FRANK W. ROLLER.

Witnesses:
GERTRUDE T. PORTER,
MAY T. McGARRY.